United States Patent [19]

White

[11] Patent Number: 4,693,426
[45] Date of Patent: Sep. 15, 1987

[54] TUB CHOPPER

[76] Inventor: Allen A. White, Rte. 2, Box 9, Peabody, Kans. 66866

[21] Appl. No.: 415,655

[22] Filed: Sep. 7, 1982

Related U.S. Application Data

[62] Division of Ser. No. 229,347, Jan. 29, 1981, Pat. No. 4,364,526.

[51] Int. Cl.$^4$ .......................................... B02L 13/286
[52] U.S. Cl. ........................................ 241/18; 241/30
[58] Field of Search .................. 241/18, 101 A, 101.7, 241/186 R, 186.2, 30, 186.4, 189 R, 189 A

[56] References Cited

U.S. PATENT DOCUMENTS

| | | |
|---|---|---|
| 2,538,677 | 6/1950 | Endsley . |
| 2,650,745 | 9/1953 | Oberwortman ............ 241/189 R X |
| 2,938,674 | 5/1960 | Lee . |
| 3,615,059 | 10/1971 | Moeller ...................... 241/186.4 X |
| 3,946,952 | 3/1976 | Martin ........................ 241/189 R X |
| 3,966,128 | 6/1976 | Anderson et al. ........... 241/186.2 X |
| 3,979,074 | 9/1976 | White et al. ........................ 241/30 |
| 4,087,051 | 5/1978 | Moeller ................................ 241/27 |
| 4,088,272 | 5/1978 | Grillot .................................. 241/30 |
| 4,134,554 | 1/1979 | Morlock ...................... 241/186 R X |
| 4,154,961 | 5/1979 | Makofka et al. ................. 241/10 A |

Primary Examiner—Timothy V. Eley
Attorney, Agent, or Firm—Kokjer, Kircher, Bradley, Wharton, Bowman & Johnson

[57] ABSTRACT

A tub chopper and method of use wherein the tub is mounted at an angle of between 35 degrees and 50 degrees with respect to horizontal. The cylindrical sidewall of the tub is carried by a pair of powered rollers cooperating with a track so that a major component of the weight of the sidewall and material in the tub is applied radially to the rollers. A loading attachment is provided for depositing material in the tub. Chopping apparatus employing rows of conventional sickle sections, each inclined at an angle in at least two different directions from radial, is provided proximal the lower region of the V-shaped cavity between the stationary tub floor and rotatable sidewall. An adjustable curved gauge proximal the chopping apparatus controls the rate of feed of material into the apparatus. Baffle structure adjacent the chopping station directs currents of air to be filtered by chopped material in the material discharge conveyor.

6 Claims, 7 Drawing Figures

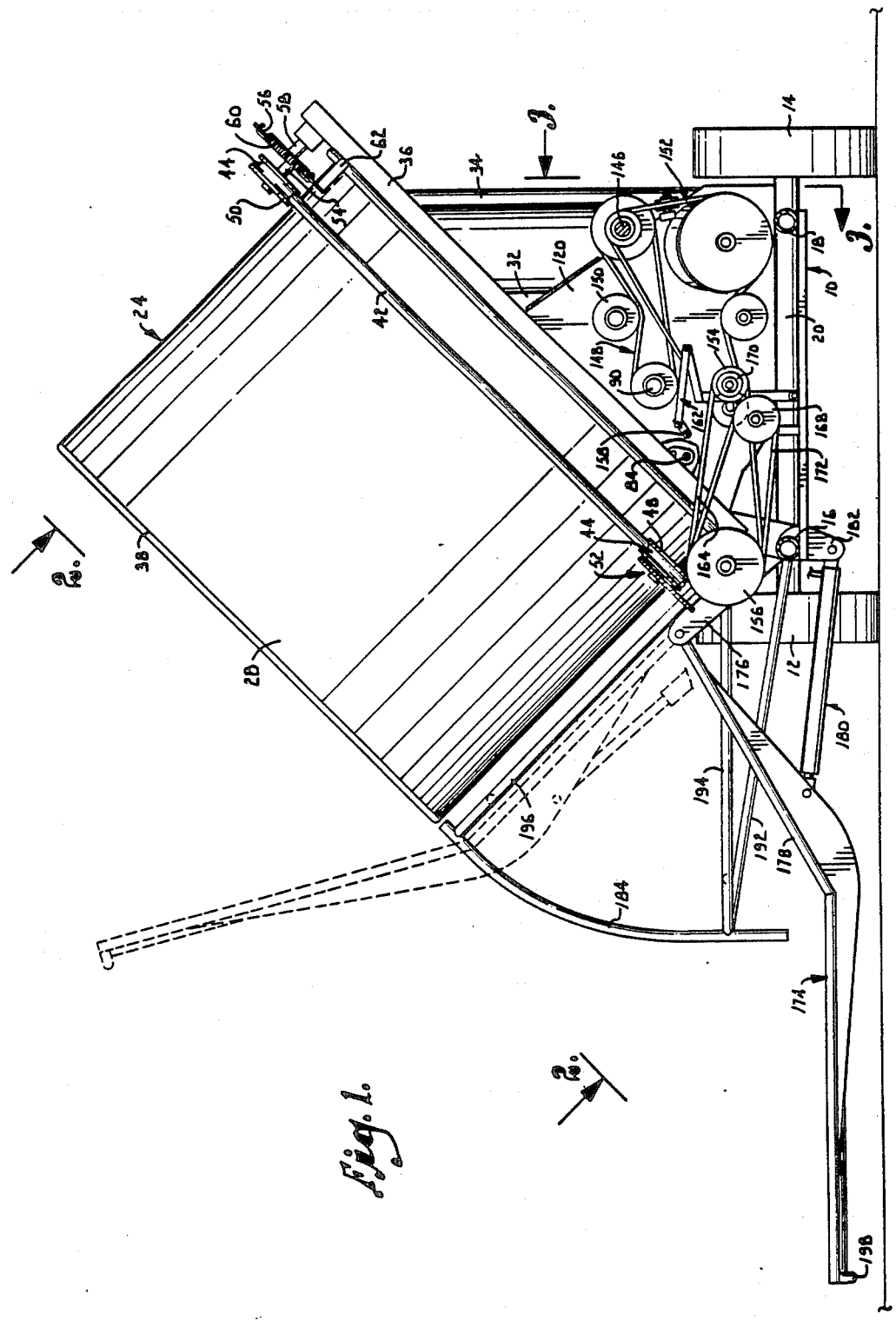

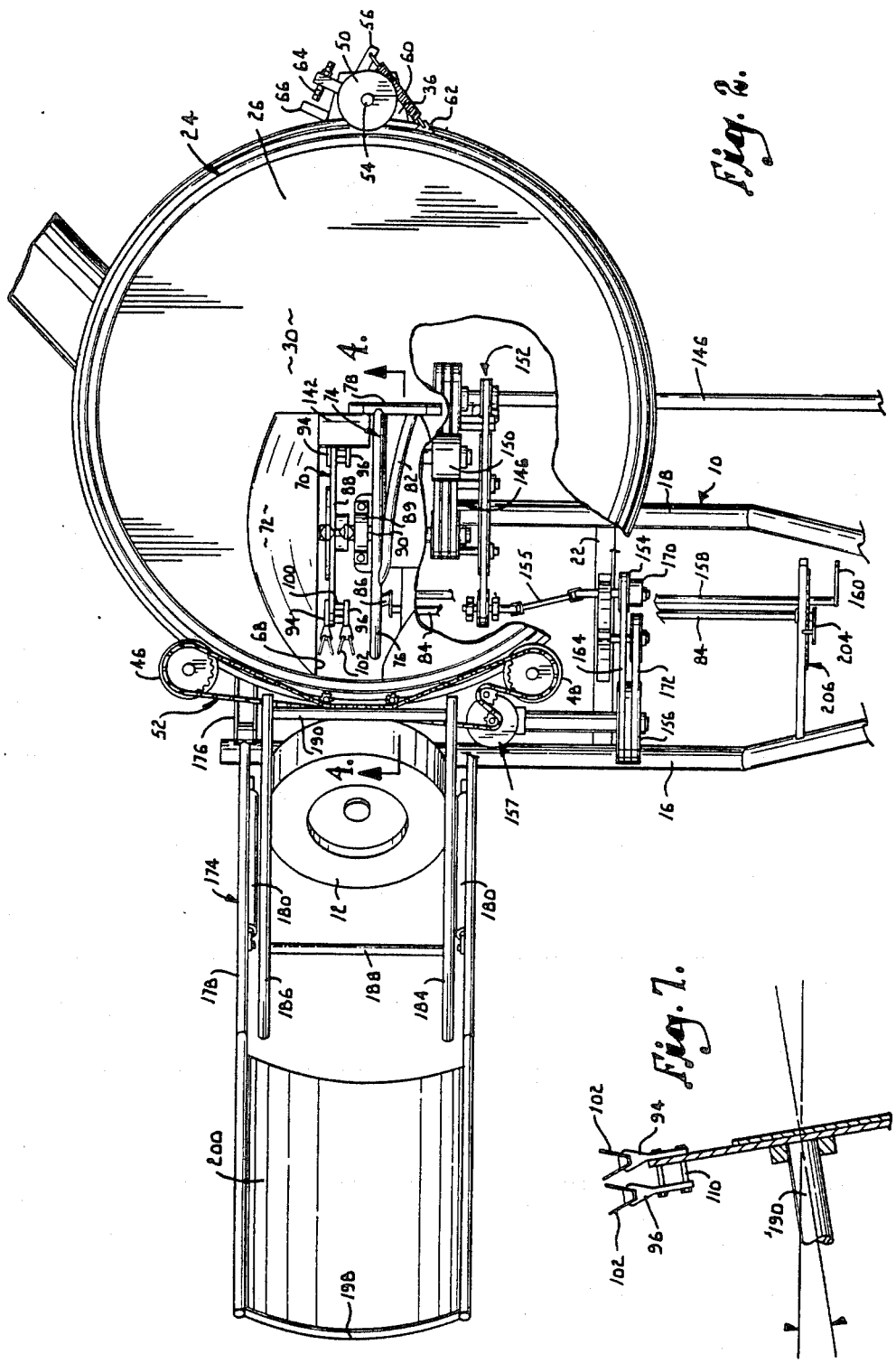

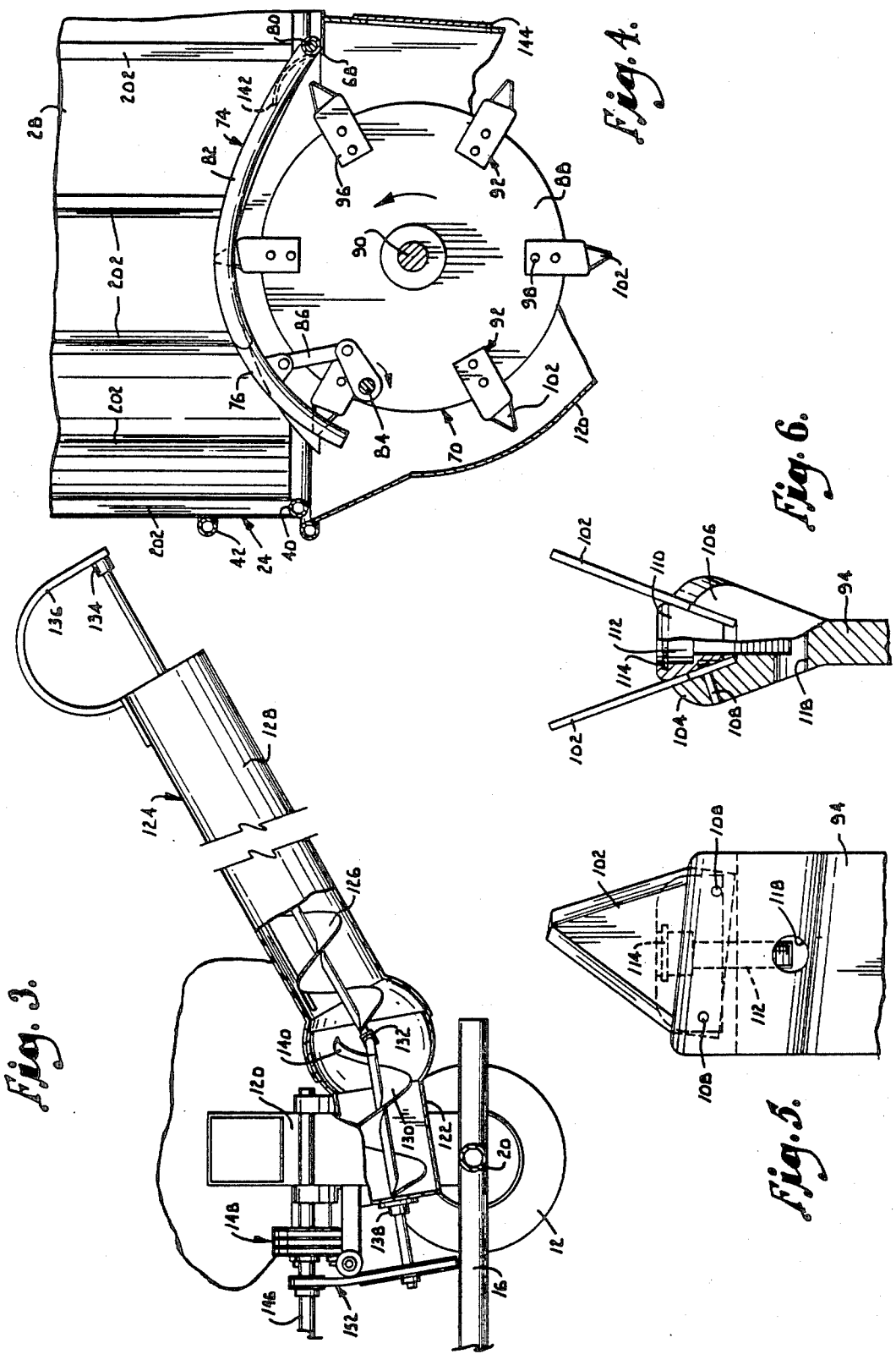

TUB CHOPPER

This is a division of application Ser. No. 229,347, filed Jan. 29, 1981, now U.S. Pat. No. 4,364,526.

This invention relates to apparatus for comminuting material, and more particularly to apparatus for chopping material such as animal feed in nature of hay, fodder, stover and the like to a consistency for enhanced accessability and increased palatability to the animal. Feed of this nature is commonly processed into large, transversely circular bales at harvest for convenient handling and storage. It is often desirable to grind or chop such material before it is fed to animals.

A variety of machines for processing such material have heretofore been suggested and are commercially available. By and large, these machines are commonly called "tub grinders" or "tub choppers" because they incorporate grinding or chopping machines in combination with a large material hopper or "tub" adapted to receive such large bales and move them into contact with the chopping or grinding apparatus. The particulate or chopped material is removed from the apparatus by any of a number of types of conveyors associated with the various machines.

Typically, these machines have a stationary, generally horizontal floor comprising the bottom of the tub, and a cylindrical sidewall which is rotated to move the material into contact with the grinding or chopping apparatus projecting through the tub bottom. Usually the sidewall is rotated by friction drive rollers or, in some cases, sprocket drives associated with a chain welded around the outer surface of the sidewall. Baffles are commonly employed on the sidewall inner surface in an attempt to enhance the movement of material into contact with the grinding or chopping apparatus.

While tub grinders or choppers of this kind have been commercially successful, a number of significant deficiencies have been encountered. Probably the greatest drawback has been the excessive amount of power required for their operation. The material has not been fed uniformly to the comminuting apparatus. Rather, with heretofore available machines the material tends to feed intermittently and in "slugs" resulting in greatly increased power requirements. The baffles required in such machines to move the material seem to exacerbate this problem.

Other problems with presently available machines of this kind concern the drives for the cylindrical tub sidewall. The vertical cylinder must be mounted for rotation and this requires substantial and expensive bearing devices for the necessary support. In addition, cost of the friction drive devices employing pneumatic tires or the like is substantial. The chain and sprocket drives which are sometimes used are also expensive and difficult to maintain.

Other deficiencies encountered with presently available machines pertain to the dust and air pollution associated with their use, the inconvenience encountered in loading material into the tub and the tendency for the comminuted material to clog in the discharge apparatus.

It is, therefore, a primary object of this invention to provide improved equipment of this general type which is constructed in a novel manner in order to overcome the disadvantages and deficiencies of those machines heretofore available.

In the achievement of the foregoing object, it is a very important object of the invention to provide a machine constructed in a novel manner to insure uniform feed to the comminuting apparatus, thus significantly lowering the power required for operation of the machine.

Another important object of the invention is to provide a machine inherently easier to load with material than those heretofore available.

Still a further object of the instant invention is to provide a machine constructed in a manner wherein the weight of material in the tub is applied radially to the tub support rollers in order to economize in the construction and also enhance the friction drive for the tub.

It is a yet further object of the invention to incorporate into the machine novel baffle structure to accomplish filtering of fine material generated by the comminuting operation from the air before it is discharged to the atmosphere.

Another very important object of the present invention is to provide improved comminuting apparatus utilizing readily available sickle sections or knives which may be quickly and easily changed when they become damaged or worn.

A further object of the invention is to provide novel mounting structure for the knives to maximize the effectiveness and to increase the useful life thereof.

These and other important objects of the invention will be further explained or become obvious from the following description in the specification and explanation of the drawings wherein:

FIG. 1 is a front elevational view of an improved tub chopper incorporating the principles of this invention, parts being broken away and shown in cross-section to reveal details of construction, the dumping position of the loading attachment appearing fragmentally in dash lines;

FIG. 2 is a fragmentary plan view taken along line 2—2 of FIG. 1, parts being broken away to reveal details of construction;

FIG. 3 is a fragmentary cross-sectional view taken along line 3—3 of FIG. 1, with parts appearing in elevation and with certain parts being broken away and shown in cross section to reveal details of construction;

FIG. 4 is an enlarged fragmentary cross-sectional view taken along line 4—4 of FIG. 2, with parts appearing in elevation;

FIG. 5 is a still further enlarged, fragmentary side elevational view of one of the knife assemblies for the chopper, parts appearing in phantom for clarity;

FIG. 6 is a fragmentary front elevational view of the assembly of FIG. 5, parts being broken away and shown in cross-section to reveal details of construction; and FIG. 7 is a fragmentary detailed cross-sectional view on the scale of FIG. 4 of an alternate embodiment of the invention wherein the shaft for the rotary knife assembly is inclined at an angle with respect to horizontal.

The embodiment of the machine chosen for illustration includes a frame 10 mounted on wheels 12 and 14 for towing behind a prime mover such as a farm tractor. Frame 10 includes fore and aft members 16 and 18 interconnected by a transverse axle 20 journalling wheels 12 and 14. The frame is further stabilized by a transverse member 22.

A cylindrical tub broadly designated by the numeral 24 is carried by frame 10 and includes a stationary floor 26 mounted on the frame, and an annular sidewall 28 projecting upwardly from the floor to define a material receiving cavity 30 over the floor and within the sidewall. Floor 26 is generally planar and is mounted at an angle with respect to horizontal as appears clearly in FIG. 1. Stability for the floor in this position is enhanced by a plurality of vertically extending braces 32 and 34 welded to frame 10 and to floor 26. The structural rigidity of floor is increased by means of transversely extending braces 36 (FIG. 1) in the nature of angle or channel irons or the like.

The upper and lower edges of the cylindrical sidewall 28 are made more rigid by top and bottom rings 38 and 40 respectively. These rings may be formed from pipe as shown best in FIG. 4, and are welded to the sidewall to rigidify the relatively thin sidewall member. A third ring 42 is disposed in circumscribing position on the outer surface of the sidewall and is welded thereto in spaced parallelism with the bottom rim of the sidewall to form a track around the tub. Ring 42 is complementally received within the annular peripheral groove 44 provided in each of 3 rollers 46, 48 and 50 respectively. Rollers 46, 48 and 50 are mounted on the frame for rotation about shafts extending parallel with the central axis of the inclined tub as shown in the drawings and, together with the ring 42 provide the mounting for tub sidewall 28 to be rotated about its axis.

Rollers 46 and 48 are powered by means of a sprocket and chain drive 52 best shown in FIG. 2. On the other hand, roller 50 is unpowered but serves as a guide roller to hold the sidewall in place. Roller 50 is journaled on a stub shaft 54 (FIG. 1) carried by a crank 56 which is pivotally mounted on a shaft 58 secured to the uppermost end of brace 36. One arm of crank 56 is connected to one end of a spring 60, the other end of which is fastened to a bracket 62 rigidly secured to and extending upwardly from the tub floor 26. The other end of crank 56 carries an adjustable stop 64 which cooperates with an abutment 66 rigid to the tub floor. Manifestly, spring 60 biases roller 50 into firm contact against ring 42 but permits limited swinging movement of the roller to accommodate for irregularities in the contour of the tub sidewall and limited shifting movement of the latter as it is rotated during operation of the machine or during transport of the machine over rough terrain. Adjustable stop 64 and abutment 66 limit the extent of movement of roller 50, however, to insure that the sidewall remains on its track and in proper position overlying the floor.

The two transversely circular rings 38 and 40 are welded to the inner surface of the upper and lower rims of the sidewall while ring 42 comprising the track for supporting and rotating the sidewall is welded to the outer surface of the latter. This permits the use of relatively thin material in the construction of the sidewall by imparting distinctly greater rigidity than would be available if all rings were either on the inside surface of the sidewall or on the outside surface thereof.

Floor 26 of the tub is generally planar and is provided with an elongated opening 68 proximal the lowermost region of the tub to permit the projection through the opening of chopping or comminuting apparatus broadly designated by the reference numeral 70. A region 72 of floor 26 on one side of apparatus 70 is bulged upwardly in convex contour for a reason to be explained more fully hereinafter. A longitudinally curved gauge 74 includes an elongated upwardly curved bar 76 integral with a cross member 78 which is pivotly mounted on a shaft 80 rigidly secured to tub floor 26. A brace 82 generally curved in the manner of bar 76 has one end secured to the latter intermediate its ends and extends at an angle therefrom with the other end of the brace secured to member 78 as best shown in FIGS. 2 and 4. Bar 76 is attached to a rock shaft 84 by means of linkage 86 so that rotation of shaft 84 effects raising or lowering of gauge 74 through the pivoting of member 78 on shaft 80.

The enhanced operation resulting from a machine constructed pursuant to the principals of this invention could be obtained by utilizing any of a number of different types of chopping, grinding or comminuting apparatuses. However, applicant has found that distinctly beneficial results are to be obtained by utilizing the chopping apparatus 70 comprising a wheel 88 in the form of a disc carried by a rotatable shaft 90 journaled in bearing means 89 suitably carried by frame 10. As best appears in FIG. 4, wheel 88 carries a plurality of cutter assemblies 92 spaced apart peripherally of the wheel and projecting radially outwardly therefrom. In the preferred embodiment each assembly 92 includes a pair of spaced apart knife holders 94 and 96 disposed on opposite sides of wheel 88 and releasably secured to the latter by bolt means 98. Referring to FIG. 2, it may be seen that the holders 94 are secured in an embracing relationship to one side surface of wheel 88 whereas the holders 96 are spaced outwardly from the opposite surface of the wheel by means of spacers 100. This construction permits four knife sections 102 to be used in each cutter assembly with room enough for effective operation of the sections.

Referring now particularly to FIGS. 5 and 6 it may be seen that the holders 94 are preferably cast or otherwised formed in the shape of a "Y" presenting a pair of spaced apart ears 104 and 106 diverging outwardly from one another at an angle with the smooth inwardly facing surfaces disposed to present a flat seat for the respective knife sections 102 which are preferably commercially avaialble sickle sections. Pins 108 rigidly secured in their respective projections 104 and 106 project inwardly into the groove defined by the respective projections in position to fit into the mounting holes in the knife sections. Each holder has an elongated wedge 110 which is drilled to receive a capscrew 112 threaded into holder 94 (FIGS. 5 and 6) to releasably retain the knife sections in their proper cutting postions. A retainer 114 is received in a groove in wedge 110 above the cap screw to facilitate removal of the wedge for changing the cutters. A transversely extending bore 118 through holder 94 insures easy installation or removal of the capscrews by releasing any foreign material which might otherwise interfer with the threading of the capscrew into the holder. The capscrew may be provided with a socket recess (not shown) for installing the capscrew by means of a wrench or the like.

Operation of the chopper tends to cause wearing action primarily at the leading edge of the knife sections resulting in a curved contour at this leading edge. Applicant has found that the reduction in chopping action which results from such wear can be minimized by inclining the knives at a forward angle toward the leading edge as shown in FIGS. 5 and 4. Accordingly, the holders 94 are configured to effect this knife inclination.

The alternate embodiment of apparatus 70 illustrated in FIG. 7 may be identical to that shown in the remainder of the Figs. of the drawings with the exception that the shaft 190 is inclined downwardly with respect to the horizontal as the forward or leading end of the machine is approached. In this embodiment, the knives 102 retained by the holders 94 describe a circular path of travel during rotation of the wheel which is at a slightly higher elevation than the path of travel of the knives 102 of the holders 96 as is clearly evident from FIG. 7. The angle of inclination of shaft 190 may be selected as desired but good results may be achieved with an angle of inclination varying from about 1 degree to about 20 degrees with an angle of inclination of about 10 degrees being considered optimum. The purpose for this inclination of the cutting apparatus is to increase the efficiency of the chopping operation as will be further described hereinafter.

Apparatus 70 is enclosed by housing 120 secured to the stationary floor 26 and extending therebelow in encirculing relationship around the cutting apparatus. The shroud or housing 120 communicates with the tubular inlet portion 122 of an elongated discharge conveyor 124 having a helical screw 126 received in a tubular housing 128. Screw 126 is connected for rotation to a screw section 130 by means of a universal joint 132 in housing 122. A bearing 134 carried by a U-shaped arm 136 secured to housing 128 journals the shft of screw 126 while a bearing 138 secured to housing 132 journals the shaft of screw section 130. An impeller vane 140 integral with the helical vane of section 130 is of reduced surface area to permit free rotation of the respective screw sections while permitting swinging of conveyor 126 and its housing 128 relative to the fixed position of screw section 130 and its housing 122. To this end, the joining ends of the housing sections are complementally configured for such relative movement as illustrated in FIG. 3.

The currents of air generated by rotation of the cutting apparatus and wheel 88 in the direction of rotation illustrated by the arrow in FIG. 4 have a tendency to discharge upwardly into cavity 30 of tub 24. These currents of air carry with them objectionable dust and debris. It has been found that the provision of a curved baffle or vane 142 (FIG. 4) secured to the tub floor and projecting outwardly over the rotating cutting wheel presents a restriction for these currents of air and direct them downwardly into housing 120 where they are discharged out through conveyor 124. Further, by selecting a relatively large cross sectional dimension for this conveyor, on the order of about 16 to 24 inches diameter, these currents of air are filtered through the material in the conveyor providing a sifting and cleansing of the air sufficient to reduce pollution. It has been found that the pollution can be kept to a minimum, even at the discharge end of the conveyor, as a result of use of the structure described.

A removable door 144 covers an opening in housing 120 to permit easy access to the cutter or chopping appratus 70. Door 144 is particularly advantageous for removal and installation of the cutter knives.

Power for driving the tub chopper of this invention is provided through a main power shaft 146 which may be connected to a power source such as the power takeoff of the prime mover. Belt and pulley drive means 146 operably coupled to shafts 146 and 90 respectively provides the power for cutter 70. An idler 150 maintains proper belt tension. A belt drive 152 takes power from shaft 146 to drive conveyor 124 and also drive a pulley 154 through a universal drive assembly 155. Pulley 154 drives a power pulley 156 operably coupled to chain drive 52 through gear means 157 to drive rollers 46 and 48 in one direction. Pulley 154 is operably connected to a rock shaft 158 through linkage 162 in a manner such that the rotation of shaft 158 moves pulley 154 in a direction to loosen belt 164 from its driving relationship with pulley 156 and to bring pulley 154 into frictional engagement with belt 172 interconnecting pulley 156 with pulley 168. An operating handle 160 is rigidly connected to shaft 158. Pulley 154 is provided with an outwardly extending transversely circular projection 170 disposed to frictionally engage the outer surface of belt 172 to drive the latter in the opposite direction from the direction of drive of belt 164. Manifestly, this reverses the direction of the drive of rollers 46 and 48 to reverse the direction of rotation of tub sidewall 28.

It will be apparent to those skilled in the art that linkage 162 is constructed in a manner that presents and over center position when shaft 158 is in one position, locking the same in this postion. The elasticity of belt 164 when the components are locked in this position maintains this locked condition. One the otherhand, when handle 160 is moved in a direction to rotate shft 158 and release the over center lock, projection 170 is moved into frictional engagement with belt 172 to drive the tub sidewall in the opposite direction.

In the embodiment of the invention shown in the drawings, an attachment in the form of loading apparatus broadly designated by the reference numeral 174 projects laterally outwardly from the machine in position for receiving material to be comminuted by the tub chopper. Apparatus 174 includes a pair of spaced apart brackets 176 welded or otherwise rigidly secured to the frame proximal the lower most portion of the tub as shown in FIGS. 1 and 2. A pair of spaced apart arms 178 configured as shown in FIGS. 1 and 2 have the proximal ends thereof pivotedly secured to the brackets 176 to permit swinging action of apparatus 174 from the full line position thereof shown in FIG. 1 to the alternate position shown fragmentally in dash lines in FIG. 1. Fluid piston and cylinder assemblies 180 operably coupled to arms 178 and to brackets 182 integral with the frame, may be operably coupled with the tractor hydraulic system and serve to swing the loading apparatus from the material receiving position shown in FIG. 1 to the dumping position appearing in dashed lines. Curved guide bars 184 and 186 are interconnected by transverse braces 188 and 190 and are rigidly secured to the frame 10 by struts 192,194, and 196. The outermost ends of arms 178 are connected to a curved member 198 extending therebetween and providing support for a transversely curved web 200 presenting a platform for apparatus 174.

In operation apparatus 174 is initially moved to the down or loading position shown in FIG. 1. Material to be comminuted by the machine is deposited on the platform. Often such material comprises a large round bale of hay, forage, stover, or similar material. Assembies 180 are activated to swing apparatus 174 in an arc to the dash line position illustrated in FIG. 1. The bale or other material on the platform is retained thereon by the curved bars 184 until such time as the material is permitted to slide directly into cavity 30 of the tub. Apparatus 174 can then be lowered to be in position for receiving the next bale or load of material to be deposited into the tub.

The operator, using handle 160, rotates shaft 158 into position to transmit motive power from shaft 146 to the drive rollers 46 and 48. Ordinarily, in normal operation of the machine, handle 160 is positioned to cause sidewall 28 to rotate in a clockwise direction as viewed in FIG. 2. Shaft 146 drives wheel 88 in the counterclockwise direction as seen in FIG. 4. The bale or other material in the tub receives a constant urging upwardly by the rotating sidewall while at the same time it is gently turned. If the material comprises a large generally cylindrical bale, the turning tends to be on an axis extending transversely through the bale. To this end, a plurality of vertically extending, periphially spaced apart, transversely square tubes or ribs 202 (FIG. 4) are welded or otherwise rigidly secured to the inner surface of sidewall 28 to insure that the material is moved by the rotating sidewall while it is in the tub.

The rotation of the sidewall urges the material into and over the curved and arcuate surfaces presented by the components of gauge 74. The elevation of gauge 74 is determined by the setting selected by the operator by rotating shaft 84. A lever 204, having a releasable latch 206, is conveniently located with respect to the operator for this purpose. Manifestly, the height of gage 74 is selected by the operator to achieve the best chopping or comminuting of the material in the tub. This height will vary depending upon the nature of the material and also the manner in which it is compacted. The lower the position of gage 74, the greater the bite or cut taken by the knives 102 on their circular paths of travel extending into cavity 30 through opening 164 in the stationary floor.

FIG. 4 illustrates how bar 76 and brace 82 are both curved in a manner approximating concentricity with cutter wheel 88. The curvature of gauge 74 is such that the gauge remains generally a uniform distance from the outer periphery of cutting apparatus 70 throughout the range of its limited path of travel pivoting about shaft 80. This gauge configuration insures relatively uniform chopping action by the cutters, regardless of the position to which the gauge may be adjusted.

Material cut by the knives moves through housing 170 and then to conveyor 174 under the influence of gravity, currents of air generated by the rotating wheel 188 as deflected by baffle 142, and also by the movement of the knives themselves. The comminuted material is, of course, discharged out the open end of the conveyor. The convex region 72 of floor 26 adjacent the cutting apparatus aids the smooth transition of the material past the cutting station under the influence of the rotating sidewall, particularly during reverse rotation.

The angled disposition of tub 24 with respect to horizontal is extremely important to the improved cutting action obtained with the tub chopper of this invention. The sloping sidewall 28 cooperates with the sloping tub floor 26 to present a "V" shaped cavity therebetween so that the material is partially supported by the sidewall and partially supported by the floor. At the same time, the angles of the floor and the sidewall with respect to horizontal are such that the material is constantly urged by gravity to slide toward the lower region of the cavity to the position of the cutting station. The continued rotation of the sidewall with its ribbed inner surface gently agitates and turns the material with a uniform and continuing lifting and rotating motion. As a result, knives 102 exert a constant and even chopping action which gnaws away at the material in a uniform manner, suggestive of the manner in which the material is uniformly gnawed from a pencil in a conventional pencil sharpener.

It will be apparent to those skilled in the art that the gentle and continuous urging of the material, not only by gravity along the paths of travel as defined by the angled floor and sidewall, but also the rotation of the cylindrical sidewall about an axis perpendicular to the stationary floor, elimiates the slugging and intermittent feeding which has been a serious drawback of prior art devices. The bafflings projecting inwardly from the surface of the vertically extending sidewall of prior art devices physically engaged and pushed or otherwise agitated the material into contact with the cutting station. The agitation provided by these types of devices was necessarily intermittent and the resultant intermittent feed to the chopper or grinder necessitated substantially greater horsepower than is required for the machine of this invention.

It is, of course, important that the axis of the cylindrical tub be inclined at a sufficient angle so that both the floor and the sidewall are disposed at angles greater than the angles of repose of material on these components. This insures that the material in the tub will slide or gravitate toward the cutting station. Good results may be obtained with most materials if the angle of the floor with respect to horizontal is within a range of about 35 degrees to about 50 degrees, and an angle of approximately 45 degrees is considered optimal.

The weight of the sidewall and material in the tub is borne primarily by rollers 46 and 48. The angled position of the tub causes a substantial component of the load to be applied radially through the rollers to their respective shafts. This design feature simplifies the bearings and supports required to withstand the loads involved, significantly reducing the cost of fabrication and maintenance of the machine. Further, the weight of the tub and material in the tub aids in achieving good frictional engagement of the drive rollers on track 42, completely eliminating the need for costly pneumatic tires or other devices for rotating the sidewall.

The embodiment shown in FIG. 7 wherein the cutter shaft is inclined with respect to horizontal may be employed where enhanced cutting action is desired. Such construction is also beneficial in achieving maximum life from the cutter knives 102. The paths of travel of the different rows of knives define an imaginary cylinder which is parallel with the wheel shaft and therefore inclined to the path of travel of the material in the tub as the material is moved across the cutting or chopping station by rotation of the sidewall. Such inclination of this imaginary cylinder better exposes the individual knives to the material and increases the amount of comminution achieved at the station. Also, the greater exposure of the knives in the downstream row of knives causes the knives in both rows to wear more uniformly than if the shaft is horizontal.

In the description of this invention the word comminution has been used to mean the reduction of hay, straw, fodder, stover or other material into particulate consistency of smaller particle size. The size of the particles of the material processed by the machine can, of course, be varied by varying such things as the relative speeds of certain components and also the nature of the chopping or grinding apparatus itself. It is considered that such choices are well within the ability of those skilled in the art and it is not necessary to define in detail the manner in which these variations may be accompolished. Neither is the use of the word comminution intended to convey an implication that material processed by the machine will necessarily or even ordinarily be in a pulverized state unless, of course, such result is desired by the user.

An additional benefit resulting from the inclination of the tub is the ease with which material may be loaded into the tub. Apparatus 174 may take the form of an attachment which can be removed or not utilized at the option of the user. With or without the attachment, it is much easier to place material into the canted tub than has heretofore been possible with conventional upright tub construction.

It is sometimes desirable to reverse the direction of rotation of the tub during operation of the machine. This may be necessary, for example, to insure that the last small quantity of a load of material be processed through the cutting station. In some cases the weight of such small quantity may not be sufficient to insure that it moves into the cutter when the tub is rotated in the usual direction. The operator can quickly and easily reverse the direction of rotation by manipulating lever 160 as described above.

Having thus described my invention, I claim:

1. A method of comminuting material comprising the steps of:
    confining the material between a pair of members disposed to define a V-shaped cavity therebetween, the respective angles of inclination of each member being greater than the angle of repose of the material thereon to insure gravitation of the material toward the bottom of the cavity;
    maintaining one of said members stationary;
    moving the other member across the path of gravitation of material on the stationary member to engage said material with the moving member; and
    chopping the material at a station proximal the bottom of the cavity, whereby the moving member and gravitation of the material cooperate to produce uniform feeding of the material to the chopping station.

2. The invention of claim 1, wherein said moving member is cylindrical, and wherein the step of moving said member includes rotating the latter about an axis generally perpendicular to said stationary member.

3. The invention of claim 2, wherein is included the step of controlling the rate at which said material is fed into the chopping station.

4. The invention of claim 3 wherein said controlling step includes the step of partially supporting the material with an adjustable support proximal the chopping station, whereby to selectively vary the amount of material engaged by the chopping means as the material is fed to the latter.

5. The invention of claim 1, wherein said chopping station includes a tubular discharge conveyor for comminuted material, and wherein is included the step of directing air currents generated at the chopping station through the material in the conveyor tube to thereby filter the air before discharging to atmosphere.

6. The invention of claim 5, wherein said chopping station includes a rotatable chopper having a plurality of knives projecting radially outwardly and extending into the cavity, and wherein is included the step of rotating said knives on a path of travel generally parallel to and in the direction of the path of travel of material gravitating along said stationary member, whereby to enhance the drawing of material through the chopping station and discharge of said air currents and material outwardly through the conveyor tube.

* * * * *